United States Patent [19]
Williams

[11] Patent Number: 4,651,461
[45] Date of Patent: Mar. 24, 1987

[54] FISHING ROD HANDLE

[76] Inventor: Charles R. Williams, 1716 Edith Marie Dr., Beavercreek, Ohio 45431

[21] Appl. No.: 874,954

[22] Filed: Jun. 16, 1986

[51] Int. Cl.⁴ .......................................... A01K 87/00
[52] U.S. Cl. .......................................... 43/23; 43/22
[58] Field of Search ........................... 43/23, 22, 21.2

[56] References Cited
U.S. PATENT DOCUMENTS

| | | | |
|---|---|---|---|
| 2,600,259 | 6/1952 | Palmer | 43/23 |
| 2,711,292 | 6/1955 | Taggart | 43/22 |
| 3,296,732 | 1/1967 | Magnus | 43/23 |
| 4,244,132 | 1/1981 | Hoffman et al. | 43/21.2 |

Primary Examiner—Nicholas P. Godici
Assistant Examiner—Karen Skillman
Attorney, Agent, or Firm—Biebel, French & Nauman

[57] ABSTRACT

A fishing rod handle having an upper elongate segment, a lower elongate segment, and an arcuate connecting segment joining the upper and lower segments so that the handle has generally a U-shape. The upper and lower segments include upper and lower portions shaped to be grasped by a human hand, and the lower segment includes a reel seat positioned forwardly of the lower portion. The handle may be grasped comfortably by both hands while casting such that the hands are positioned in different planes. In a preferred embodiment, the handle is weighted so that the center of gravity of a combination of the handle and an associate rod shaft lies along the upper segment directly across from the reel seat.

15 Claims, 6 Drawing Figures

FISHING ROD HANDLE

BACKGROUND OF THE INVENTION

The present invention relates to fishing tackle and, more particularly, to fishing rod handles.

Many types of fishing rod handles have been devised which attempt to give the user greater flexibility in the positioning of his hand relative to the rod and reel combination, and which attempt to provide greater accuracy and a more natural "feel" to the act of casting. For example, the Taggart et al. U.S. Pat. No. 2,711,292 shows a fishing rod handle having an elongate portion aligned with the rod shaft and shaped to be grasped by the hand of the user, and a fishing reel attached to the rear of the handle by an arcuate shank, which positions the reel below and to the rear of the handle. While the user of a fishing rod having that handle has a relatively long and unobstructed length of handle to grasp, the fishing rod requires a specially designed reel and arcuate connecting shank, so that the choice of reels usable with such a rod handle is severely limited.

Another type of fishing rod handle is shown in the Magnus U.S. Pat. No. 3,296,732. That fishing rod handle is L-shaped, having an elongate section oriented parallel to the rod shaft and adapted to seat a fishing reel of the open bail type, and a hand grip attached to the rear of the elongate section and oriented perpendicular to it. A disadvantage of this type of rod handle design is that the user is somewhat limited in the positioning of his hand on the elongate section, since the reel attaches to the underside of it and therefore presents an obstruction.

A disadvantage inherent in both of the aforementioned rod handles is that the casting characteristics of the rod and handle can be adversely affected by the selection of a particular reel. Selection of a reel which is relatively heavy or light may shift the overall center of gravity of the system to a location along the rod shaft or handle such that the act of casting imparts undesirable torques to the rod shaft and handle which tends to decrease the accuracy of the cast.

Accordingly, there is a need for a fishing rod handle which provides a variety of unobstructed locations for a user to place his hands relative to the rod shaft and reel. There is also a need for a fishing associated rod handle which is designed to provide a more natural and yet a more powerful casting action. There is also a need for a fishing rod handle which is sufficiently flexible to accommodate a wide variety of standard fishing reel designs and sizes, without sacrificing the accuracy of a cast or the natural "feel" of the rod and reel as a combined casting system.

SUMMARY OF THE INVENTION

The present invention is a fishing rod handle which is shaped to allow a two-handed casting action and which can accommodate both spinning and casting reels. The fishing rod handle of the present invention includes an upper segment having an upper elongate portion shaped to be grasped by a human hand and a forward end adapted to receive the base of a fishing rod shaft, a lower segment having a lower elongate portion shaped to be grasped by a human hand and having a lower forward end which includes a reel seat, and a connecting segment joining the upper and lower segments so that they are parallel to each other. The upper and lower portions of the rod handle are unobstructed by a reel seat so that a user is free to position his hands anywhere along their lengths to perform a two-handed casting motion.

In a preferred embodiment of the invention, the handle is weighted such that the center of gravity of the combined handle and rod shaft is located along the upper portion directly across from the reel seat. It has been found that, by positioning the reel across from the center of gravity of the rod and handle, undesirable torques which frequently develop during a casting action are eliminated. This results in a smoother, more accurate casting motion.

Also in the preferred embodiment, the upper segment, lower segment, and connecting segment are formed from a continuous section of aluminum alloy tubing having a U-shape. In an alternate embodiment, the hollow tube is replaced by a solid aluminum alloy bar, having a U-shape. With either design, the rod handle, exclusive of the reel seat, is preferably covered with a continuous foam cushion.

With either embodiment, weights may be added to position the center of gravity of the rod shaft and handle combination at the desired location along the upper segment. For the embodiment having a hollow tube, the weighting is accomplished by positioning a predetermined amount of lead shot in the connecting segment and securing it with a suitable adhesive. For the embodiment in which the segments comprise a solid bar, the weights preferably are in the form of washers positioned about the connecting segment beneath the foam cushion and secured by a suitable adhesive.

An advantage of the rod handle of the present invention is that the shape of the handle enables the user to grasp the handle with both hands such that his hands are offset from each other and are in different planes. Consequently, a casting motion can be performed which imparts much greater power to the rod than can be achieved with casting motions utilizing elongate handles in which the user's hands lie in the same plane. Should the user choose to cast with one hand, he may grasp the upper segment of the rod handle, preferably at the center of gravity, and perform a casting motion by a snap of the wrist.

Accordingly, it is an object of the present invention to provide a fishing rod handle which is designed to be grasped by a user at a variety of unobstructed locations for one or two-handed casting; a fishing rod handle in which the reel seat is positioned across from a section of the handle including the center of gravity of the combined rod handle and shaft to reduce undesirable torques; and a fishing rod handle which can accommodate a variety of rod and reel designs.

Other objects and advantages of the invention will be apparent from the following description, the accompanying drawings, and the appended claims.

BRIEF DESCRIPTION OF THE DRAWINGS

FIG. 5 is a somewhat schematic side elevation of an alternate embodiment of the fishing rod handle of FIG. 1, shown supporting a rod shaft and a casting reel; and FIG. 6 is a somewhat schematic side elevation of the fishing rod handle and rod shaft shown in FIG. 1.

DETAILED DESCRIPTION OF THE PREFERRED EMBODIMENT

Figure 1:
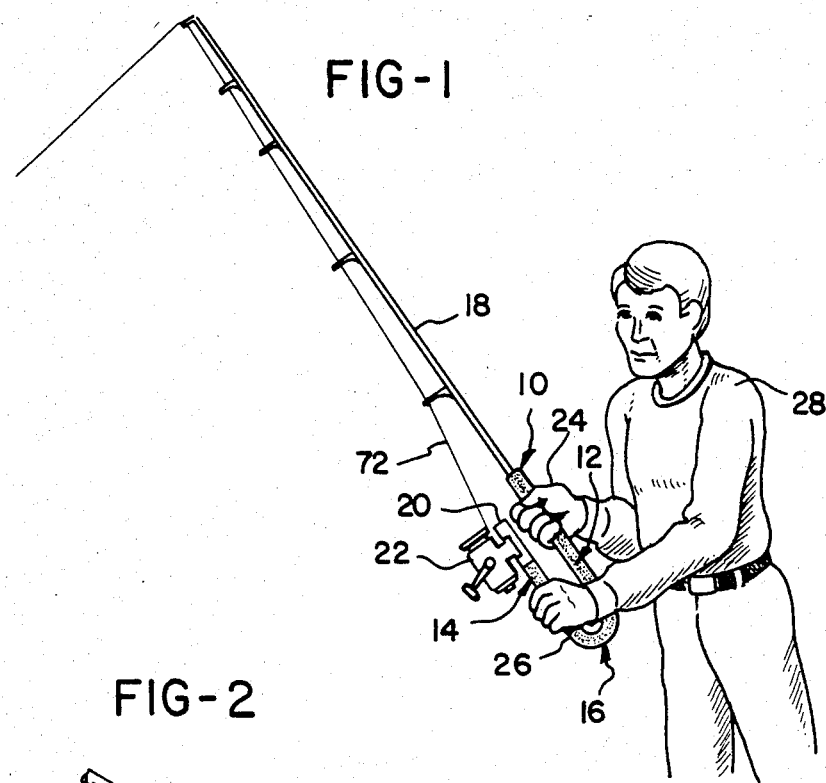
FIG. 1 is a perspective view of the preferred embodiment of the fishing rod handle of the present invention, shown attached to a fishing rod shaft and being held by a user.

As shown in FIG. 1, the fishing rod handle of the present invention, generally designated 10, includes an upper segment 12, lower segment 14, and connecting segment 16, which combine to form a U-shape. The upper segment 12 supports a rod shaft 18 and the lower segment 14 terminates in a reel seat 20 which supports a reel such as the open bail spinning reel 22 shown in FIG. 1. The upper and lower segments 12, 14, respectively, are sized to be grasped by the hands 24, 26, of a user 28.

Figure 3:
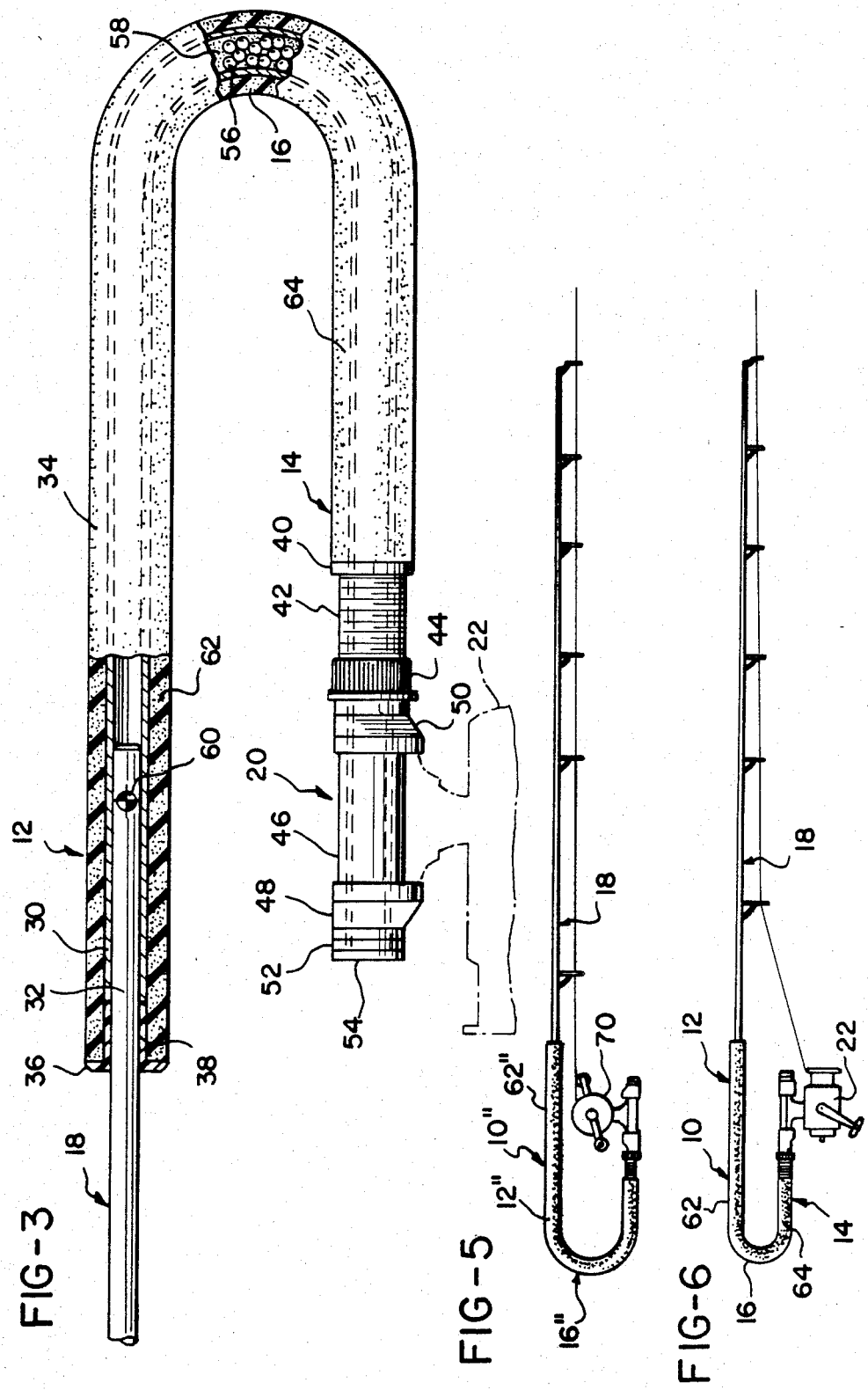
FIG. 3 is a side elevation of the fishing rod handle of FIG. 1, in which the foam grip and hollow tubing are partially in section and the fishing reel is shown in phantom.

As shown in FIG. 3, the preferred embodiment of the rod handle 10 includes a section of hollow aluminum alloy tubing 30 bent to form the U-shape which includes the upper, lower, and connecting segments 12, 14, 16. The forward end of the upper segment 12 receives the butt 32 of the rod shaft 18 which is secured therein by a suitable adhesive. A substantial portion of the length of the tubing 30 is enclosed in a tubular foam grip 34 which is preferably made of EVA (polyethylene vinyl acetate) or nitrile PVC 1200 (polyvinyl chloride). The forward end of the grip 34 overhangs the tubing 30 and receives an aluminum end cap 36 (which alternately may be made of vinyl), which includes an annular boss 38 that extends between the butt 32 and grip 34.

The opposite end of the grip 34 is adjacent to an aluminum spacer 40 and the reel seat 20. The reel seat 20 is of conventional design and includes a threaded section 42, nut 44, and a smooth section 46 slidably supporting a pair of collars 48, 50. Collar 48 is retained in the smooth section 46 by an aluminum spacer 52 and a vinyl butt cap 54.

In the preferred embodiment, the rod handle 10 includes lead shot 56 retained in the connecting segment 16 by a suitable adhesive foam 58. The lead shot 56 is weighted such that the center of gravity 60 of the shaft 18 and handle 10 is located at a point along an upper elongate portion 62 of the upper segment 12 which is directly across from the reel seat 20. The lower segment 14 includes a lower elongate portion 64 positioned rearwardly of the reel seat 20 and oriented parallel to the upper portion 62.

Figure 4:
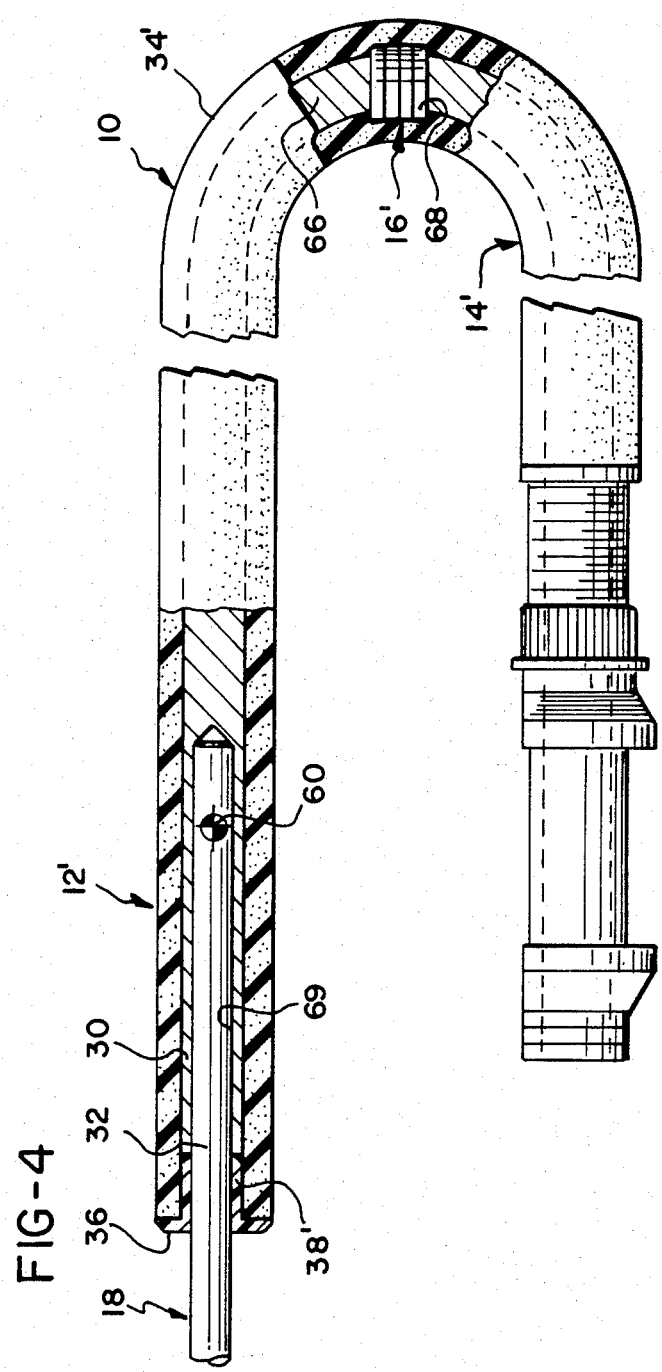
FIG. 4 is a detail of an alternate embodiment of the fishing rod handle of FIG. 1, showing the foam grip partially broken away.

In an alternate embodiment of the rod handle 10' shown in FIG. 4, the upper, lower, and connecting segments 12', 14', 16', respectively, together comprise a solid, cylindrical aluminum alloy bar 66 which is enclosed in a foam cushion 34'. With the handle 10', the weighting is achieved by the addition of a predetermined number of annular weights 68 which are sized to extend over the bar 66 and beneath the cushion 34'. The weights 68 are attached to the connecting segment 16' by a suitable adhesive.

The bar 66 includes a countersink 69 at its end which receives the rod butt 32 which is retained by a suitable adhesive. The end of the upper segment 12' includes a cap 36' to fill the gap between the cushion 34' and the bar 66. Alternately, the bar could be shaped to extend from the cushion 34' and receive a rod butt having a ferrule, in a conventional manner.

As shown in FIG. 6, the rod handle 10 is shaped such that sufficient space is provided between the upper and lower segments 12, 14, to allow the hand 24 of a user 28 to be postioned comfortably anywhere along the upper elongate portion 62 and lower elongate portion 64 without interference from the reel 22 (see also FIG. 1). In another embodiment of the invention, shown in FIG. 5, the rod handle 10" is modified to accommodate a casting reel 70, which may be of the type suitable for surf casting. The rod handle 10" includes a connecting segment 16" having a larger radius of curvature than the connecting segment 16 of the handle 10 in FIG. 6. This allows sufficient clearance between the top of the casting reel 70 and the upper elongate portion 62" of the upper segment 12" so that a user will be able to grasp the portion at any desired location along it length.

To perform a two-handed casting operation, the user 28 grasps the handle 10 as shown in FIG. 1. If an open bail spinning reel 22 is employed, the forefinger of the user's hand 24 grasps the line 72 in a conventional fashion. Although it is advisable for the user to grasp the upper portion 62 at or near the center of gravity 60 (see FIG. 3), a user may desire to position his hand 24 at another location either closer to the end of the upper segment 12, or behind the center of gravity 60. The other hand 26 of the user 28 is positioned on the lower portion 64 behind the reel seat 20.

The casting motion is effected by the user drawing back the rod shaft 18 by extending his left hand 16 and pulling back his right hand 24, then reversing the hand motion to snap the rod shaft forward, at the same time releasing the line 72.

Figure 2:
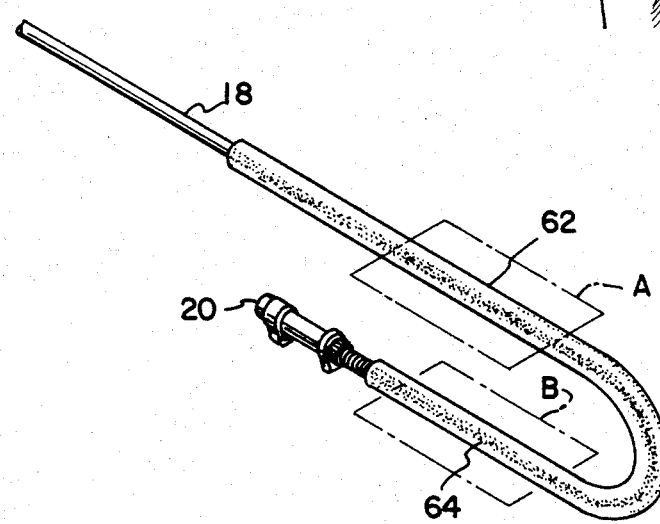
FIG. 2 is a perspective view of the fishing rod handle of FIG. 1, in which the separate, parallel planes containing the upper and lower segments are shown in phantom.

As shown in FIG. 2, the increased accuracy and power from such a casting technique results in part from the fact that the upper and lower portions 62, 64 lie in two parallel, separate planes A, B. This "two-plane" hold increases the mechanical advantage of the user over conventional one-handed casting techniques and casting techniques in which both hands grasp a substantially linear rod handle along its length. This casting technique is especially effective for surf casting, utilizing the rod handle 10" shown in FIG. 5.

Should the user so desire, a one-handed casting technique may be employed in which the user grasps the handle 10 with the right hand 24 as shown in FIG. 1, but does not touch the handle with the left hand 26. The casting process is performed merely by snapping the wrist to cock the rod shaft 18 backwards, then forwards, while at the same time releasing the line 72 from the forefinger of the user's right hand. Of course, for a left-handed user, the foregoing procedure is the same, except that the hand positions are reversed.

While the forms of apparatus herein described constitute preferred embodiments of this invention, it is to be understood that the invention is not limited to these precise forms of apparatus, and that changes may be therein without departing from the scope of the invention.

What is claimed is:

1. A unitary one piece fishing rod handle comprising:
    an upper segment having an upper elongate portion shaped to be grasped by a human hand and including an upper forward end adapted to receive the base of a fishing rod shaft;

a lower segment having a lower elongate portion shaped to be grasped by a human hand and having a lower forward end including means for mounting a fishing reel; and means for connecting the rearward ends of said upper and lower segments such that said upper and lower elongate portions are substantially parallel to each other and are capable of being grasped simultaneously by the hands of a user to perform a two-handed casting motion.

2. The rod handle of claim 1 wherein said mounting means is positioned such that a reel mounted thereon is adjacent to a center of gravity of a combination of said rod handle and an associated rod shaft.

3. The rod handle of claim 1 wherein said connecting means is arcuately shaped and is connected to an upper rearward end of said upper segment and a lower rearward end of said lower segment, such that said handle has substantially a U-shape.

4. The rod handle of claim 1 wherein said upper and lower segments and said connecting means combine to form generally a U-shape.

5. The rod handle of claim 1 wherein said upper elongate portion includes a center of gravity of a combination of said rod handle and an associated rod shaft.

6. The rod handle of claim 5 wherein said mounting means is positioned directly across from said center of gravity.

7. The rod handle of claim 1 wherein said upper segment, lower segment and connecting means comprise a hollow tube having generally a U-shape.

8. The rod handle of claim 7 wherein said tube includes weight means for positioning a center of gravity of a combination of said handle and an associated rod shaft at a location along said upper elongate portion at a point directly across from said mounting means.

9. The rod handle of claim 7 further comprising a cylindrical, foam grip extending along an outer surface of said tube.

10. The rod handle of claim 8 wherein said weight means includes a plurality of weight elements adhesively retained within said tube.

11. The rod handle of claim 1 wherein said upper segment, lower segment and connecting means comprise a solid, cylindrical bar having generally a U-shape.

12. The rod handle of claim 11 further comprising weight means for positioning a center of gravity of a combination of said handle and an associated rod shaft at a location along said upper elongate portion at a point directly across from said mounting means.

13. The rod handle of claim 11 wherein said weight means comprises a plurality of annular weight elements extending about said bar.

14. The rod handle of claim 11 further comprising a cylindrical, foam grip extending along an outer surface of said bar.

15. A unitary one piece fishing rod handle comprising:

a hollow, cylindrical tube having generally a U-shape and including an upper segment having an upper elongate portion shaped to be grasped by a human hand and including an upper forward end adapted to be attached to the base of a fishing rod shaft, a lower segment having a lower elongate portion shaped to be grasped by a human hand, and an arcuate connecting segment extending between rearward portions of said upper and lower elongate portions, said upper and lower segments being oriented parallel to each other;

weight means located within said tube at said connecting segment for positioning a center of gravity of a combination of said handle with an attached rod shaft at a predetermined location along said upper elongate portion;

said lower segment having a lower forward end including a reel seat and being sized such that said reel seat is located directly across from said center of gravity; and a cylindrical, foam grip extending along an outer surface of said tube from said upper forward end to said reel seat.

* * * * *